United States Patent [19]
Ashton

[11] 4,206,666
[45] Jun. 10, 1980

[54] PRESS CONTROL SYSTEM

[75] Inventor: Bruce F. Ashton, Windsor, Canada

[73] Assignee: James Joseph Morrison Management Ltd., Windsor, Canada

[21] Appl. No.: 961,301

[22] Filed: Nov. 16, 1978

[51] Int. Cl.² .............................................. B26D 7/24
[52] U.S. Cl. .......................................... 83/63; 83/362; 83/66; 192/125 A
[58] Field of Search ...................... 83/63, 58, 66, 362, 83/361, 360; 192/125 A, 127, 129 A

[56] References Cited

U.S. PATENT DOCUMENTS

| | | | |
|---|---|---|---|
| 2,029,726 | 2/1936 | Laabs | 83/66 |
| 3,160,045 | 12/1964 | Newgard | 83/63 |
| 3,721,139 | 3/1973 | Robinson et al. | 83/63 |
| 3,786,976 | 1/1974 | Murphy | 83/63 |
| 3,979,980 | 9/1976 | Biester et al. | 83/62 |
| 4,006,655 | 2/1977 | Maurer | 83/63 |
| 4,046,040 | 9/1977 | Bourdo | 83/63 |

*Primary Examiner*—Donald R. Schran
*Attorney, Agent, or Firm*—Cullen, Sloman, Cantor, Grauer, Scott & Rutherford

[57] ABSTRACT

A continuous feed stamping machine, press or the like, has a control system for automatically stopping the machine in the absence of material to be stamped. The control system includes a normally closed limit switch which is held open by the presence of material to be stamped. After each stamping operation, as the stamped product is released from the die area, the limit switch returns to its normally closed position. If the limit switch is not opened by the feed of more material, within a predetermined time interval, the machine is stopped. The time interval is related to the operating frequency of the machine such that in the absence of material the machine will be stopped before the machine is damaged. The control system, which may operate in either the astable (oscillating) or monostable (one-shot) mode, effects the charging of a capacitor when the limit switch closes, and the capacitor discharges when the limit switch opens. If the limit switch is not opened by the feed of new material, within the preselected time interval, the charging of the capacitor above a threshold voltage causes the machine to be stopped.

10 Claims, 3 Drawing Figures

TO MOTOR 13 CLUTCH & TO PRESS BRAKE.

4,206,666

PRESS CONTROL SYSTEM

BACKGROUND OF THE INVENTION

The environment of the present invention is a machine stamping operation which uses a continuous feed of sheet material into the die area of a reciprocating stamping machine. More specifically, the stock or material is fed into the stamping area of a press having a stationary die and a die mounted on a vertically reciprocating ram, and as the material is stamped or punched by the reciprocating die, the stamped workpiece is severed from the sheet and dropped into a container as a completed part. This is all conventional.

One of the overriding considerations in a continuous feed press system is the damage to the machine caused by the reciprocating die coming into contact with the stationary die in the absence of material to be punched. This can cause damage to either or both dies and is an undesirable facet of machine operation which requires constant monitoring of the material feeding in order to manually stop the machine in the absence of material. Constant monitoring is required since the absence of material can be caused not only by exhausting the supply of sheet material, but also by a breakdown or jamming of the material feeding apparatus.

SUMMARY OF THE INVENTION

The present invention solves the problems of the prior art in machine press operation by providing for automatically shutting down the machine whenever there is an absence of material in the die area for a prolonged period of time relative to the frequency of reciprocation of the ram.

One of the major advantages of the present invention in regard to the operation of the press is that it is completely adjustable to the speed at which the material to be punched or stamped is fed to the press. The speed at which the material is fed to the press must, of course, be related to the speed of reciprocation of the press ram. The invention uses a timer in conjunction with the charging and discharging of a capacitor. The charging and discharging rate of the capacitor is adjustable through potentiometers to correspond to the frequency at which the reciprocating ram of the press is operating.

The material detecting mechanism used is a limit switch which is normally closed, i.e., biased so that the switch arm is in the normally closed position. The closed position of the limit switch indicates the absence of material to be punched and the open position of the limit switch indicates the presence of material to be punched. When the limit switch is closed, power is coupled to the timer circuitry to start the charging of a capacitor. When the limit switch is opened, the capacitor is discharged to ground. However, if material is not present before the capacitor charges to a certain threshold, the press is automatically stopped.

A test switch is provided so that the circuit may be put through its cycle in order to see if it is effective in stopping the press. This is desirable in order to test for malfunctions before the press begins operation to determine whether the limit switch is operating properly and the timer circuit and press control relay are operating within the required limits.

The timing means functions to charge and discharge a capacitor based on the absence or presence of material, respectively. If the capacitor does not charge to a threshold before the limit switch opens, the limit switch and timing means cooperate to discharge the capacitor to ground and the timer is prepared for the next cycle of operation. In the astable or oscillatory mode of operation, if the capacitor charges to its threshold and stops the press, the circuitry still provides for discharge of the capacitor internally through the timer so that the system is ready for the next press cycle. This recycling feature permits the timer mechanism to be prepared for a next operation without any manual resetting. However, in the monostable or one-shot mode of operation, power to the timer must be turned off to discharge the capacitor once the capacitor reaches its threshold.

DESCRIPTION OF THE DRAWINGS

The various objects and advantages of the present invention will become more apparent upon reading the following detailed description taken in conjunction with the drawings.

In the drawings, wherein like reference numerals identify corresponding parts.

DETAILED DESCRIPTION

Figure 1:
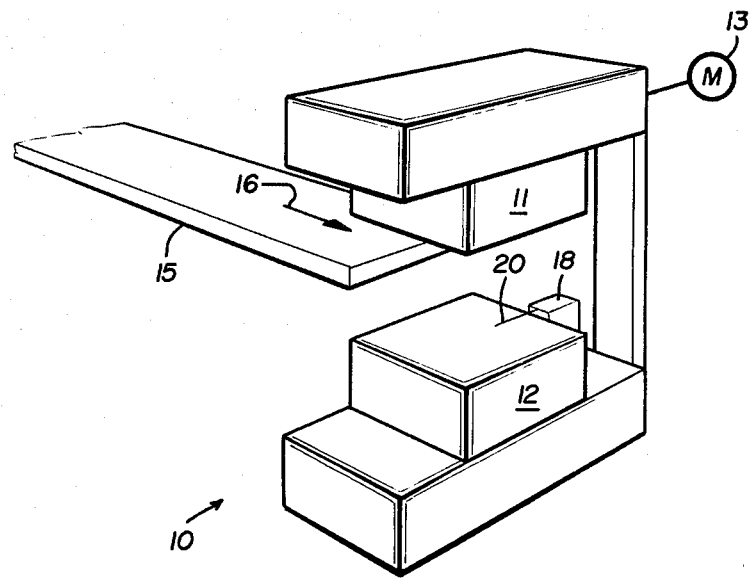
FIG. 1 is a perspective diagrammatic view of a press and material feed.

FIG. 1 illustrates a press 10 which contains a vertically reciprocating ram 11 and a stationary bed 12. Upper and lower die halves are secured to the ram and bed, respectively, as is conventional, and the speed of the ram is controlled by an electric motor 13. The region between the die halves is referred to as the die area. The sheet or stock material 15 enters the die area where the stamping or punching operation is performed on the downstroke of the ram. Thereafter, as the ram starts its upstroke, the finished workpiece drops clear of the die area and more of the sheet material is automatically fed into the die area as indicated generally by the arrow 16.

As the sheet material 15 is fed into the die area the material itself trips the limit switch 18 by moving the wiper arm 20 of the limit switch 18 from its normally closed position to an open position. In the absence of sheet material, such as after a finished workpiece drops clear of the die area or when the supply of sheet material is exhausted, the wiper arm 20 automatically moves back to the normally closed position.

Figure 2:
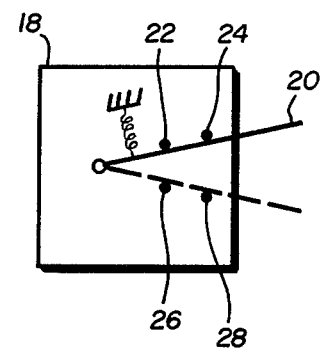
FIG. 2 is a diagram of the limit switch and its wiper arm operation.

FIG. 2 illustrates the details of the operation of the limit switch 18 showing the wiper arm 20 in the normally closed position connecting together the normally closed contacts 22 and 24 and further illustrates the wiper arm 20 engaging contacts 26 and 28 when the wiper arm 20 is pushed into the open (dashed line) position by the presence of material 15. Thus, when there is no sheet material in the die area, the wiper arm 20 is in the closed (solid line) position shown, the contacts 22 and 24 are closed and the contacts 26 and 28 remain open. When the sheet material 15 is fed into the die area it pushes the wiper arm 20 away from the contacts 22 and 24, and into the dashed line position thereby closing the contacts 26 and 28. The result of this opening and closing of the contacts will be discussed in conjunction with the schematic diagram of FIG. 3.

Figure 3:
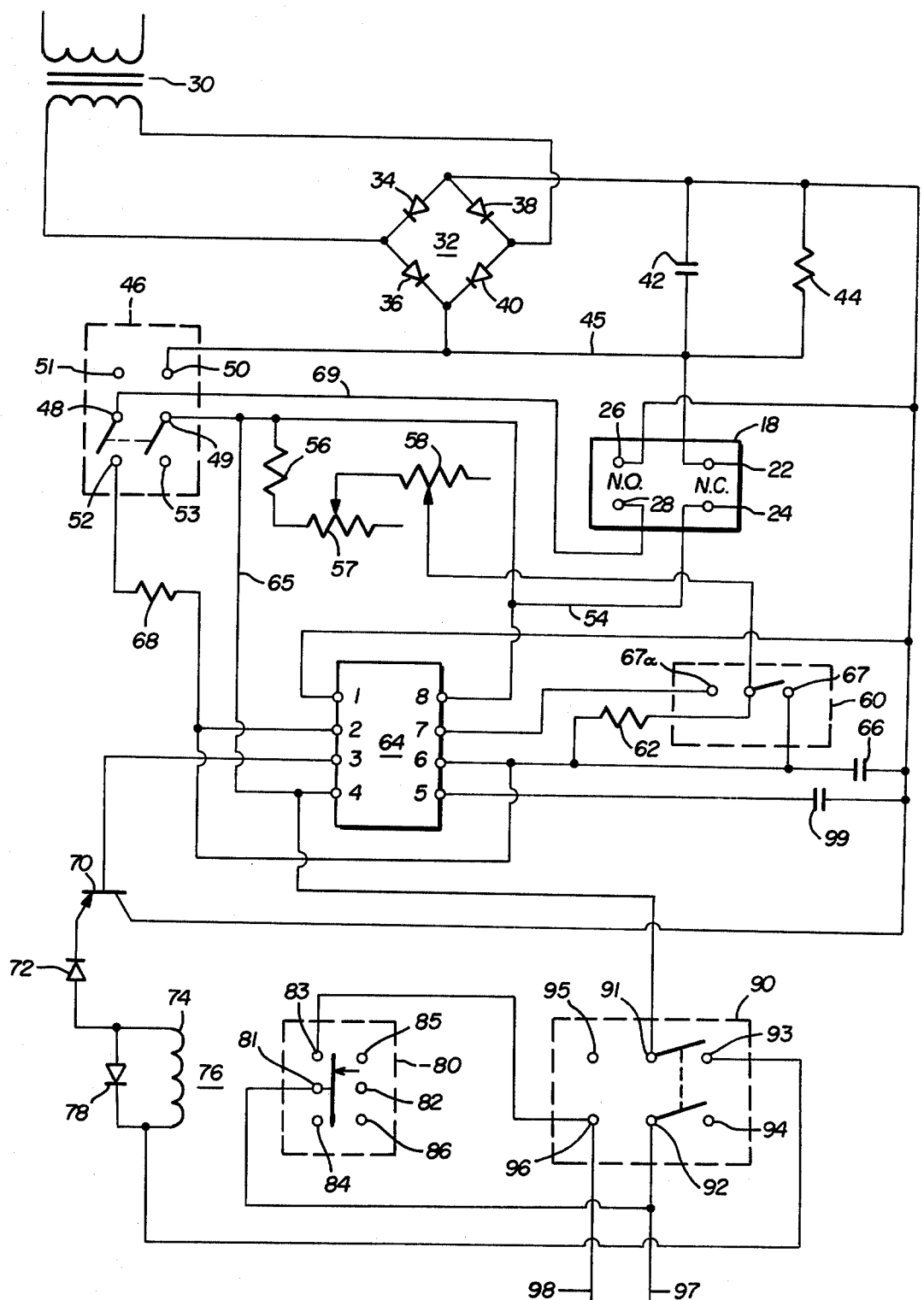
FIG. 3 is a schematic diagram of the circuit of the present invention including the limit switch and timing means for controlling the press motor.

The limit switch, the timing means and the associated circuitry for control of the press motor 13 are shown in FIG. 3 in conjunction with a 110 volt a.c. source and stepdown transformer 30 which converts the 110 volts to 12.6 volts which in turn is full wave rectified by a diode bridge 32 consisting of diodes 34, 36, 38 and 40. The d.c. output of the diode bridge is smoothed by a capacitor 42 in parallel with the bridge with the high or positive bridge output being fed to contact 22 of the limit switch 18. A drain resistor 44, in parallel with both the bridge 32 and capacitor 42, serves to drain off the power to system ground when the 110 volts is switched off.

The high output of the diode bridge 32 is also fed by a lead 45 to a test switch 46. Test switch 46 is a double pole, double throw switch having common terminals 48, 49, terminals 50 and 51 at one side, and terminals 52 and 53 on the opposite side. The positive voltage from bridge 32 is connected by lead 45 to terminal 50. When the test switch is in the normal position, the switch arms connect terminal 48 to terminal 52 and terminal 49 to terminal 53. This serves to connect terminal 52, through terminal 48, to the low side of the bridge 32 (system ground) when the normally closed limit switch 18 is opened.

The power to the timing means of the circuit will now be explained. When limit switch 18 is in its normally closed position, voltage is coupled through limit switch contacts 22 and 24 and then along lead 54 to terminal 49 of switch 46 and also to one side of a first resistor 56. The opposite side of resistor 56 is coupled to a first potentiometer 57. The wiper arm of the first potentiometer is coupled to a second potentiometer 58. The wiper arm of the second potentiometer is coupled to the common terminal of a mode selector switch 60. The common terminal of switch 60 is coupled through a resistor 62 to pin 6 of a 555 timer 64.

To also provide power to the timer, positive voltage is coupled from contact 24 of switch 18 to timer pin 8, via lead 54, and from terminal 49 of test switch 46, via lead 65, to timer pin 4.

A capacitor 66 is coupled between pin 6 of the timer and the negative potential side of resistor 44, capacitor 42 and diode bridge 32. The capacitor 66, at pin 6 of the timer, is of course also coupled to resistor 62, and the junction of resistor 62 and capacitor 66 (i.e., pin 6) is also connected to terminal 67 of mode selection switch 60.

The timer 64 permits capacitor 66 to charge, when limit switch 18 is closed. Should the limit switch open before the capacitor 66 charges to its threshold, means are provided to discharge the capacitor. Specifically, a resistor 68 has one side connected to terminal 52 of test switch 46 and the other side connected to both pins 2 and 6 of timer 64. Thus when normally open switch 18 closes, with switch 46 in its normal position, the charge on capacitor 66 will dissipate across resistor 68, through switch 46, along lead 69 to the normally open side of switch 18 and then to system ground.

To complete the circuit for stopping the press, a transistor 70 has its base connected to pin 3 of timer 64. The collector of the transistor is coupled to negative potential and the emitter of the transistor is coupled through diode 72 to the primary 74 of a relay 76. A protective diode 78 is connected across the relay primary 74. The secondary 80 of the relay is configured as a normally closed switch having common terminals 81, 82, normally closed terminals 83, 84, and normally open terminals 85, 86.

A double pole, double throw override switch 90 is provided, having common terminals 91, 92, a first set of terminals 93, 94 for normal operation and a second set of terminals 95, 96, for override operation. Common terminal 91 is connected to pin 4 of timer 64. Relay terminal 83 is connected to override switch terminal 96. Override switch terminal 93 is connected back to the primary of relay 76, and relay terminal 81 is connected to override switch terminal 92. Lead 97 connects terminal 92 in series with the clutch of motor 13 and the brake of the press, and lead 98 connects terminal 96 in series with the clutch of motor 13 and the brake of the press.

Pin 5 of the timer 64 is bypassed to ground through a noise filtering capacitor 99. Pin 1 of the timer is connected to negative potential (system ground) and pin 2 of the timer is tied to pin 6.

Having thus described the circuit, the operation of the system will now be described. The operation of the system will be described first for monostable or one-shot operation and then for astable operation. In the following explanation, it will be assumed that both the test switch 46 and the override switch 90 are in their normal positions.

Consider first the monostable or one-shot mode of operation. Mode selector switch 60 will have its wiper arm connected to terminal 67. If no material is present in the die area, the wiper arm 20 keeps the contacts 22 and 24 in a closed position, thus coupling power to the timer, and power flows through resistors 56, 58, and 60 to charge capacitor 66. The RC time constant, is based on capacitor 66 and resistors 56, 58, and 60. Resistors 58 and 60 are 10 K ohms and 100 K ohms, respectively, and both are adjustable to provide a coarse and a fine adjustment of the time constant. The time constant, of course, should be correlated to the press speed.

If the capacitor 66 charges up to a threshold of two-thirds of its maximum charge, then the timer pin 3 goes low or to ground. This provides a voltage difference between pin 3, which is now low, and pin 4 which is always high. The low voltage at pin 3 causes switching transistor 70 to conduct, and the power through relay primary 74 releases the relay secondary 80. This breaks the contact between terminals 81 and 83 of the relay secondary, thus opening the circuit between override switch contacts 92 and 96, opening the circuit between leads 97 and 98 disengaging the clutch of motor 13 and engaging the brake so that the press is stopped.

Since the system is operating in the monostable or one-shot mode, the capacitor 66 will not discharge until the limit switch 18 has been opened or power to the timer turned off.

On the other hand, during monostable operation, if the normally closed limit switch detects the presence of material to be stamped before the capacitor 66 has charged to two-thirds of the capacitor value, then the wiper arm 20 moves so as to open the normally closed contacts 22 and 24 and close the normally open contacts 26 and 28 as discussed in conjunction with FIG. 2. The consequence of this action by the limit switch is to drain off the charge on capacitor 66 by way of resistor 68 and connected contacts 52 and 48 and then via lead 69 through the closed contacts 28 and 26 to the low side of the diode bridge or reference ground. This prevents the internal timer terminal 3 from going low so as to keep the relay 80 from opening and thus permits continuous operation of the machine. The foregoing cycle of operation charging and discharging the capacitor 66 in an oscillatory fashion without the charge reaching two-thirds of the threshold, is that which normally occurs in a punching operation when sheet material first fed into the die area, then punched or stamped, then severed from the remainder of the sheet 15, then dropped out of the die area, and fresh material 15 is supplied.

Consider next the astable mode of operation. Mode selection switch 60 is moved so its wiper arm connects the common terminal to terminal 67a. Thus capacitor 66 and resistor 62 are now in series and can discharge through timer pin 7 because of the connection from timer pin 7 to terminal 67a.

During astable operation, assume that material 15 is being supplied without interruption. When the limit switch 18 closes, after a piece has been stamped, the capacitor 66 again begins to charge. This time, however, the RC time constant includes resistor 62 along with the aforementioned resistors 56, 58 and 60. If a new work piece or sheet material 15 is fed into position, this sheet material will contact the wiper arm of the limit switch 18 to open the normally closed contacts 22 and 24 of the limit switch and close the normally opened contacts 26 and 28 of the limit switch. This action again removes the voltage from the positive side of the capacitor 66 and permits capacitor 66 to again discharge by way of resistor 68 as previously described for the monostable operation.

If, however, there is no material present and the capacitor 66 charges up to a threshold of ⅔ of its maximum charge, then the timer 64 permits an internal discharge of the capacitor through resistor 62 to the timer pin 7. This also causes timer pin 3 to go low, or to ground, again providing the necessary triggering signal to switch the transistor 70, disengage the clutch of motor 13 and engage the press brake as heretofore described.

Thus one difference between monostable operation and astable operation is that during monostable operation, if the capacitor 66 charges up to a threshold of ⅔ of its maximum charge, the press is stopped but the capacitor does not discharge through the timer whereas in astable operation, the capacitor 66 will discharge through the timer after stopping the press to be ready for the next cycle.

The press control system described herein allows for two means of testing the system. The one method is to shut off the material feed and observe whether the reciprocating ram stops. After the last workpiece in the die area (if any) is cut and stamped the wiper arm 20 of the switch 18 will fall back to the normally closed position, to close contacts 22 and 24, and remain in such a closed position as no more material 15 will be fed. As a consequence, the contacts 24 and 22 remain closed, thereby allowing charge-up of the capacitor 66 past its two-thirds threshold in which event the timer 64 grounds the pin 3, thereby opening relay 80 and thereby stopping the press.

The other method of testing the system involves the test switch 46 which may be used when the wiper arm 20 is in the open position thus indicating the presence of a material 15 in the die area. With the material in the die area holding wiper arm open, no power reaches the timer 64 through the contacts 22 and 24. The operator then pushes a button or test switch 46 closing the contacts 50 and 51 and opening the contacts 52 and 53. The closure of contacts 50 and 51 couples voltage to the timer pins 4 and 8 and also to the capacitor 66 through the resistor 56 and potentiometers 58 and 60, thereby charging the capacitor 66. However, since the switch contacts 52 and 53 are open or not connected, there is no external path for the discharge from the capacitor 66, through resistor 68 so the capacitor when charged will cause the pin 3 of the timer to go low and cause a shut-off of the press as previously discussed.

Testing of the system by shutting off the material feed is perhaps most desirable when there is doubt as to the effectiveness of the closing of the contacts 22 and 24 of the limit switch since the limit switch operation is not tested by use of a test switch as the contacts remain open throughout the testing phase when the switch 46 is being used.

In the astable mode, the internal mechanism of the standard timer 64 provides the discharge of the capacitor 66 internally at the two-thirds value threshold because of the internal arrangement of the circuitry of the timer 64. The pin 3 of timer 64 remains in its low or grounded position until the capacitor 66 has dropped to one-third of the time constant value at which time the pin 3 terminal returns to its normal high state. This allows for continued operation of the system without resetting of the system.

The override switch 90 will now be explained. In the normal position, as previously described, the contacts 91 and 93 are connected together and the contacts 92 and 94 are connected together.

If, however, there is a desire to override the automatic shutoff of the system, then the wiper arms should be thrown to the opposite side, namely, interconnecting terminal 91 and terminal 95 and similarly interconnecting terminal 92 to terminal 96.

The consequence of this action is to both remove the power from pin terminal 4 through the switch 90 to the side of the primary 74 of the relay 76, and maintain the circuit closed between leads 97 and 98 which prevents the clutch of motor 13 from being disengaged and prevents the brake from being engaged.

The unused terminals 84, 85, and 86, as well as the unused common terminal 82, all of the relay secondary 80 will now be described. These terminals may be utilized in various ways. A counter could be activated to count the number of misfeeds during eight hours of operation. Similarly, an alarm could be wired to these contacts to provide a visible or audible signal when the system is shut down. Alternatively, during astable operation, the feeding apparatus for feeding the sheet material 15 can be automatically retriggered, when the press is stopped, to attempt to feed the sheet material into the die area.

It may be appreciated that various changes and modifications to the circuit of the present invention may be made without departing from the spirit and scope of the present invention. The invention, therefore, should be limited only by the scope of the following claims.

What is claimed is:

1. In a continuous machine press system having a motor driven press with a reciprocal ram wherein material to be stamped or punched is fed into the die area beneath the ram, the improvement of a control circuit comprising:
   first switch means to detect the presence and absence of said material in the die area;
   timing means responsive to said first switch means to provide a signal when material is absent from said die area for a predetermined time interval less than the time for the ram to travel from an extreme position to the die area; and second switch means actuated by said timing means to stop said ram in response to said signal from said timing means.

2. The invention of claim 1 wherein said timing means operates in the astable mode for constantly recycling even if said timing means actuates said second switch means.

3. The invention of claim 1 wherein said timing means operates in the monostable mode for automatically recycling only if said timing means does not actuate said second switch means.

4. The invention of claim 1 wherein said first switch means comprises a normally closed limit switch which is opened by the presence of material in the die area.

5. The invention of claim 1 wherein said control circuit further includes a test switch for testing the operation of said timing means while said normally closed limit switch is open.

6. The invention as defined in claim 1 wherein said timing means includes a capacitor which is charged when no material is in the die area.

7. The invention as defined in claim 6 wherein the capacitor is discharged externally of the timer if the presence of material in the die area is detected before the capacitor charges to a predetermined value.

8. Circuitry for detecting and signaling the absence of material from the die area of a motor driven press having a reciprocating ram comprising:
 a limit switch which detects the presence of material by opening a first set of contacts and closing a second set of contacts in response to said material;
 timing means including a capacitor and capacitor charging means for detecting the amount of time said first set of contacts are closed, said timing means providing a signal to stop said press motor when said charge on said capacitor exceeds a threshold value;
 capacitor discharge means comprising a resistor coupling said capacitor to said second set of contacts wherein the closing of said second set of contacts activates said discharge means to ground said capacitor before said capacitor charges to said threshold value; and
 second switch means responsive to said timing means signal to stop said reciprocating ram.

9. The invention of claim 8 wherein said threshold value charge on said capacitor is adjustable.

10. The invention of claim 8 and further comprising a test switch to test the operation of said timing means while said first set of contacts are open.

* * * * *